Sept. 25, 1923.
B. T. BROWAND
MILLING CUTTER
Filed March 11, 1922
1,468,857
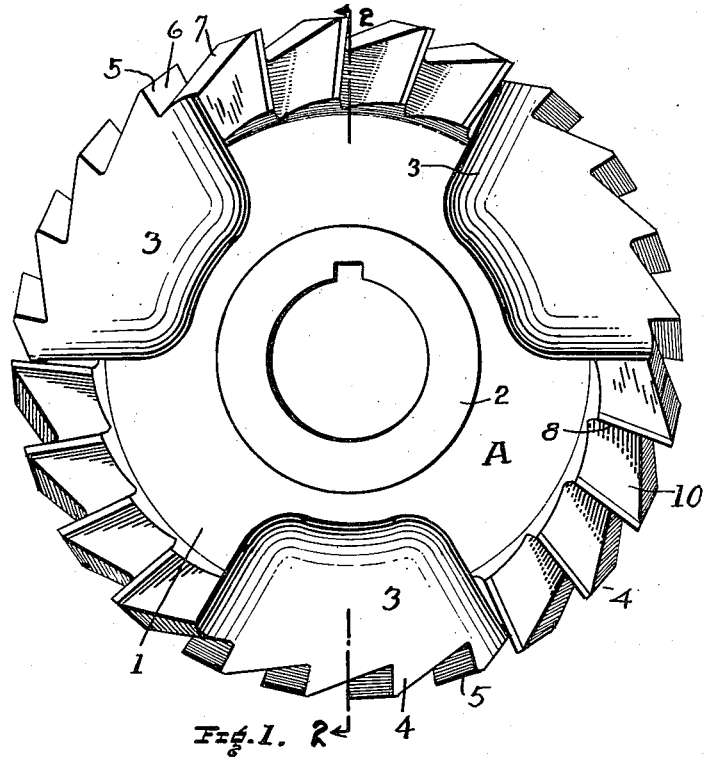
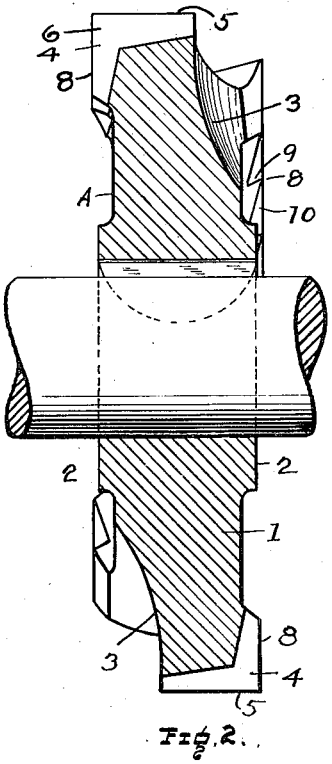
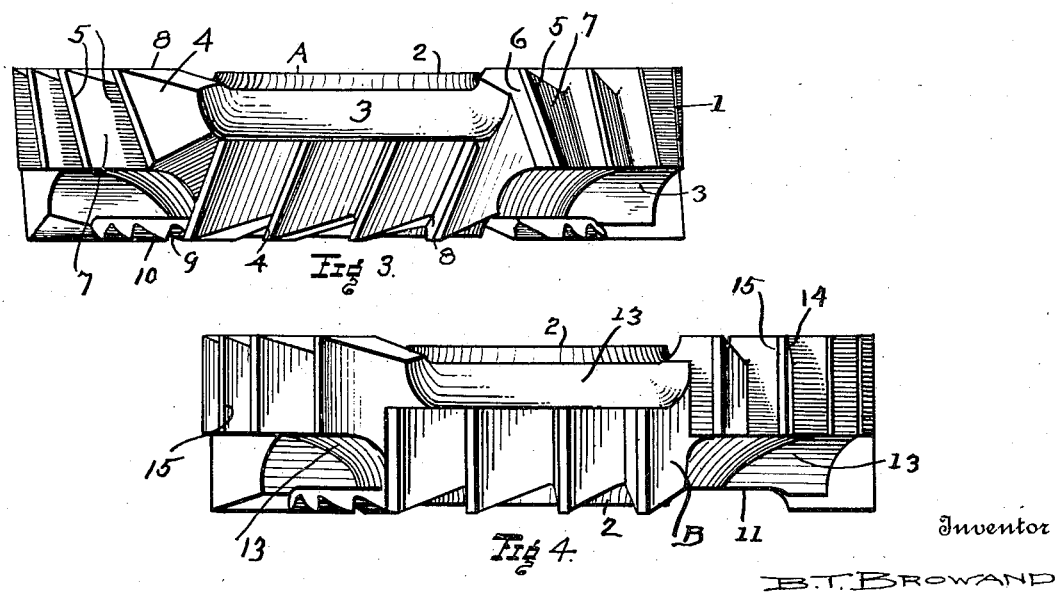
Inventor
B. T. BROWAND
By Fisher, Moser & Moore
Attorneys Patented Sept. 25, 1923.

1,468,857

UNITED STATES PATENT OFFICE.

BENJAMIN T. BROWAND, OF CLEVELAND, OHIO.

MILLING CUTTER.

Application filed March 11, 1922. Serial No. 542,852.

*To all whom it may concern:*

Be it known that I, BENJAMIN T. BROWAND, a citizen of the United States, residing at Cleveland, in the county of Cuyahoga and State of Ohio, have invented certain new and useful Improvements in a Milling Cutter, of which the following is a specification.

This invention relates to milling cutters and has for its object to provide a cutter which can be operated at higher speeds than cutters heretofore used, which requires less expenditure of power, which operates with less vibration, and which produces a smoother finish on the work than cutters heretofore used.

In the annexed drawing forming a part of this specification:

Fig. 1 is a side elevation of the preferred form of cutter.

Fig. 2 is an axial section on line 2—2 of Fig. 1.

Fig. 3 is a top plan view of the cutter.

Fig. 4 is a top plan view of a modified form of cutter.

Referring to the drawing, the cutter A consists of a circular disk 1 having a hub portion 2 and recesses 3 formed in the faces thereof and extending to the periphery. The recesses 3 on both faces of the disk alternate with uncut portions of equal arcuate extent, the recesses on one face being opposite the uncut portions of the opposite side, whereby the periphery of the disk has successive arcuate portions of equal length laterally offset with respect to each other, the arcuate portions at either side of the disk being in circumferential alinement. A series of cutting teeth 4 are formed upon each of the peripheral portions of the disk. The teeth 4 on the arcuate portions at one side of the disk are inclined in a reverse direction to those on the intermediate arcuate portions at the opposite side of the disk. The cutting edges 5 of the teeth 4 all lie in the surface of the same cylinder. The front faces 6 of the teeth at either side of the disk extend transversely of the disk at an inclination to the axis of the disk whereby the cutting edges 5 are inclined rearwardly from their outer edges to the recess 3 in the opposite face of the disk to promote cutting operations and to force the cut material into the recess. The backs 7 of the teeth 4 are in planes tangent to a similar cone intersecting the disk near the periphery whereby a gradual incline to the base of the next adjacent tooth is formed. The teeth 4 overhang on their outer sides the side face of the disk and have side cutting edges 8 extending inwardly in the plane of the front face 6 beyond the bottoms of the grooves formed between the faces 6 and 7 of adjacent teeth. The cutting edges 8 on successive offset portions of the periphery of the disk overhang the opposite side faces of the disk and lie in planes parallel with such side faces. The cutting edges 8 have front faces 9 in the planes of the front faces 6 of the main portion of the teeth and gradually inclined rear faces 10 extending from the edges 8 to the bases of the faces 9. The depth of the recesses 3 is less than half the thickness of the disk so that the cuts taken by the groups of teeth on opposite sides of the disk overlap. The material removed by each tooth 4 is carried from the outer edge and discharged in the recess 3 at its inner edge, so that the teeth are automatically kept clear of cuttings and the cutter can operate at higher speeds, less power is required to operate, and wider cutters may be used. In the modification shown in Fig. 4, the cutter B consists of a disk 11 having recesses 13 corresponding to the recesses 3 of the disk 1 and peripheral teeth 14 similar to the teeth 4 except that the cutting edges 15 thereof extend straight across parallel with the axis of the disk. Comparative tests have been made with a standard milling cutter having angularly disposed peripheral teeth with side cutters at both edges which show that the cutters A and B disclosed herein have marked superiority in power requirement and in addition operate with less vibration and produce a much smoother finish on the sides of the slot.

The test was made on a Lucas horizontal boring machine driven by a variable speed motor. Power measurements were taken by ammeter in series with the armature of the motor and a volt meter in parallel with the armature.

The speed of the spindle was determined by a revolution counter.

The following results were obtained:

Standard cutter, cut 1¼″ wide by ⅝″ deep, feed .014″ per revolution.

Peripheral speed of cutter, 63 ft. per minute.

|  | K. W. |
|---|---|
| Average motor input when cutting | 2.47 |
| Average motor input when not cutting | 1.00 |
| Average motor input to drive cutter | 1.47 |

Cutter A cut 1¼" wide by ⅜" deep.
Feed .014" per revolution.
Peripheral speed of cutter, 63 ft. per minute.

|  | K. W. |
|---|---|
| Average motor input when cutting | 1.86 |
| Average motor input when not cutting | .98 |
| Average motor input to drive cutter | .88 |

Cutter B cut 1¼" wide by ⅜" deep. Feed .014" per revolution. Peripheral speed of cutter 65 ft. per minute.

|  | K. W. |
|---|---|
| Average motor input when cutting | 2.13 |
| Average motor input when not cutting | 1.00 |
| Average motor input to drive cutter | 1.13 |

Comparison of standard cutter and cutter A.

Owing to higher peripheral speed cutter A removed 8% more metal.

$$\text{Ratio}\left\{\begin{array}{l}\text{Power to drive standard cutter}\\\text{Power to drive cutter A}\end{array}\right\} = 1.47 = 1.67$$

Standard cutter required 67% more power to drive than cutter A.

Further tests showed:
With the same power required, $$\text{Ratio}\left\{\begin{array}{l}\text{Metal removed by cutter A}\\\text{Metal removed by standard cutter}\end{array}\right\} = \frac{.022}{.014} = 1.57$$

Comparison of standard cutter and cutter B.

$$\text{Ratio}\left\{\begin{array}{l}\text{Power to drive standard cutter}\\\text{Power to drive cutter B}\end{array}\right\} = \frac{1.47}{1.13} = 1.30$$

Having fully described my invention, what I claim and desire to secure by Letters Patent, is:

1. A milling cutter, comprising a disk having recesses formed in the sides thereof extending to the periphery, the recesses being alternately arranged on opposite sides of said disk, and a series of cutting teeth formed upon said periphery, opposite each recess and open thereto and all of the teeth positioned at one side of each of said recesses being of less width than the disk.

2. A milling cutter, comprising a disk having successive arctuate peripheral portions laterally offset to each other and providing successive recesses on both sides of the disks, and a plurality of circumferentially alined cutting teeth of the same width on each of said offset portions all terminating in said recesses.

3. A milling cutter, comprising a disk having successive peripheral portions laterally offset with respect to each other to provide a relatively large arcuate recess opposite each portion and a plurality of circumferentially alined cutting teeth on each of said offset portions terminating at the opposite recess, said teeth having side cutting edges on the side toward which they are offset.

4. A milling cutter, comprising a disk having peripheral teeth arranged in arcuate groups, all the teeth in each group being of the same width and each group comprising the same number of successive circumferentially alined teeth, said groups being arranged in laterally staggered relation with alternate groups in circumferential alinement spaced a substantial distance apart to provide relatively large clearance recesses flaring outwardly toward the medial line between the sides of the disk.

5. A milling cutter, comprising a disk having peripheral teeth arranged in arcuate laterally staggered groups, each group comprising a series of successive alined teeth of the same cutting width, alternate groups of teeth being in circumferential alinement with each other, and the inner edge portions of the teeth of one group overlapping the inner edges of the teeth of the succeeding group, the opposite sides of the disks having relatively large inclined recesses adjacent each group of teeth.

6. A milling cutter comprising a disk having successive arcuate peripheral portions recessed on opposite sides to form a staggered periphery, a series of cutting teeth of the same cutting width formed upon the periphery, said teeth being inclined rearwardly from their outer edges to said recesses, each of said arcuate portions of said staggered periphery having a multiple number of cutting teeth thereon and all the teeth on each arcuate portion terminating at the recess opposite thereto.

7. A milling cutter comprising a disk having its sides recessed alternately on opposite sides to form a staggered periphery the successive relatively offset portions of the periphery and the recesses involving relatively large arcuate areas, a series of transversely inclined cutting teeth formed upon each of said offset portions of the periphery, said teeth being all of the same cutting width and inclined rearwardly from their outer edges to the recesses.

8. A milling cutter comprising a disk having radially recessed sides and its periphery divided into a series of equal arcuate sections, a series of cutting teeth of the same cutting width formed upon each of said peripheral sections opposite said recesses, the teeth of successive sections having their outer edges overhanging opposite sides of said disk and having reverse transverse inclinations, the inner edges of all said teeth terminating within the planes of the faces of the disk at the inner sides of the recesses and said recesses slanting from the central side portions of the disk toward the periphery and middle plane of the disks.

9. A milling cutter, comprising a disk having radially-spaced clearance recesses within its opposite sides extending to approximately the middle thereof and a series of peripheral cutting teeth opposite each recess extending inwardly to and terminating at the recess.

10. A milling cutter, comprising a disk having deeply recessed sector portions upon opposite sides thereof to provide flaring clearance spaces radially at spaced intervals within said sides, and each sector portion having a series of peripheral cutting teeth extending from the outer side of the disk to the inner side of the recess opposite thereto.

11. A milling cutter, comprising a disk having a hub and a series of relatively deep flaring recesses extending radially within opposite sides of said disk from its circumference nearly to said hub, the recesses on one side being staggered in respect to the recesses upon the opposite side, and the peripheral portions of the disk opposite each recess having a plurality of cutting teeth extending transversely thereof from the outer side of the disk to the inner side of the recess opposite thereto.

In testimony whereof I affix my signature to the following specification.

BENJAMIN T. BROWAND.